United States Patent [19]

Stifle et al.

[11] Patent Number: 4,633,462

[45] Date of Patent: Dec. 30, 1986

[54] MULTIPLE ACCESS COMMUNICATION ON A CATV REVERSE CHANNEL

[75] Inventors: John E. Stifle; Donald A. Lee; Donald L. Bitzer, all of Urbana, Ill.

[73] Assignee: The Board of Trustees of the University of Illinois, Urbana, Ill.

[21] Appl. No.: 514,906

[22] Filed: Jul. 18, 1983

[51] Int. Cl.[4] .......................... H04J 3/02; H04J 3/16; H04J 3/24

[52] U.S. Cl. ........................................ 370/85; 455/5; 370/95; 370/93

[58] Field of Search .................. 370/124, 85, 73, 93, 370/946, 95, 89; 455/2, 5; 358/84, 86

[56] References Cited

U.S. PATENT DOCUMENTS

| | | | |
|---|---|---|---|
| 3,668,307 | 6/1972 | Face et al. | 455/5 |
| 3,803,491 | 4/1974 | Osborn | 455/5 |
| 3,878,512 | 4/1975 | Kobayash et al. | 370/85 |
| 3,943,447 | 3/1976 | Shomo, III | 455/5 |
| 3,997,718 | 12/1976 | Ricketts et al. | 455/5 |
| 4,002,843 | 1/1977 | Rackman | 455/5 |
| 4,031,543 | 6/1977 | Holz | 455/5 |
| 4,035,838 | 7/1977 | Bassani et al. | 358/86 |
| 4,057,829 | 11/1977 | Moorehead | 455/5 |
| 4,063,220 | 12/1977 | Metcalfe et al. | 370/93 |
| 4,077,006 | 2/1978 | Nicholson | 455/5 |
| 4,090,220 | 5/1978 | Gargini | 455/5 |
| 4,161,786 | 7/1979 | Hopkins et al. | 370/85 |
| 4,282,512 | 8/1981 | Boggs et al. | 340/825.5 |
| 4,322,854 | 3/1982 | Bundens et al. | 455/5 |
| 4,343,042 | 8/1982 | Schrock et al. | 455/5 |
| 4,445,214 | 4/1984 | Reynolds et al. | 370/94 U |
| 4,528,663 | 7/1985 | Citta | 455/5 |

OTHER PUBLICATIONS

Meisner et al, "Time Division Digital Bus Techniques Implemented on Coaxial Cable", Proc. of Comp. Networking Syn., Dec. 15, 1977, pp. 112–117.

Metcalfe et al, "Ethernet: Distributed Packet Switching for Local Computer Networks", Computer Networks, 1978, pp. 3-47-3-56.

Hopkins, "Multimode Communications on the MITRENET", Proc. of the LACN Sym., May 1979, pp. 169–176.

Davies, "Computer Networks and Their Protocols", Wiley & Sons, 1979, pp. 165-168, 187-188.

Primary Examiner—Douglas W. Olms
Assistant Examiner—Wellington Chin
Attorney, Agent, or Firm—Pollock, Vande Sande & Priddy

[57] ABSTRACT

A multiple access communications system links a plurality of geographically dispersed subscriber locations (each of which including a transmitter and receiver) with a central location (also including a transmitter and receiver). Multiple access communication is required in the direction from the subscriber transmitters to the central receiver. In order to maintain stability, a subscriber/transmitter which unsuccessfully transmits (due to a collision with a transmission from another subscriber) will retransmit. Multiple succeeding unsuccessful transmissions at any subscriber result at that subscriber in increasingly longer delays between successive transmissions.

26 Claims, 12 Drawing Figures

INTERACTIVE SYSTEM BLOCK DIAGRAM

INTERACTIVE SYSTEM BLOCK DIAGRAM

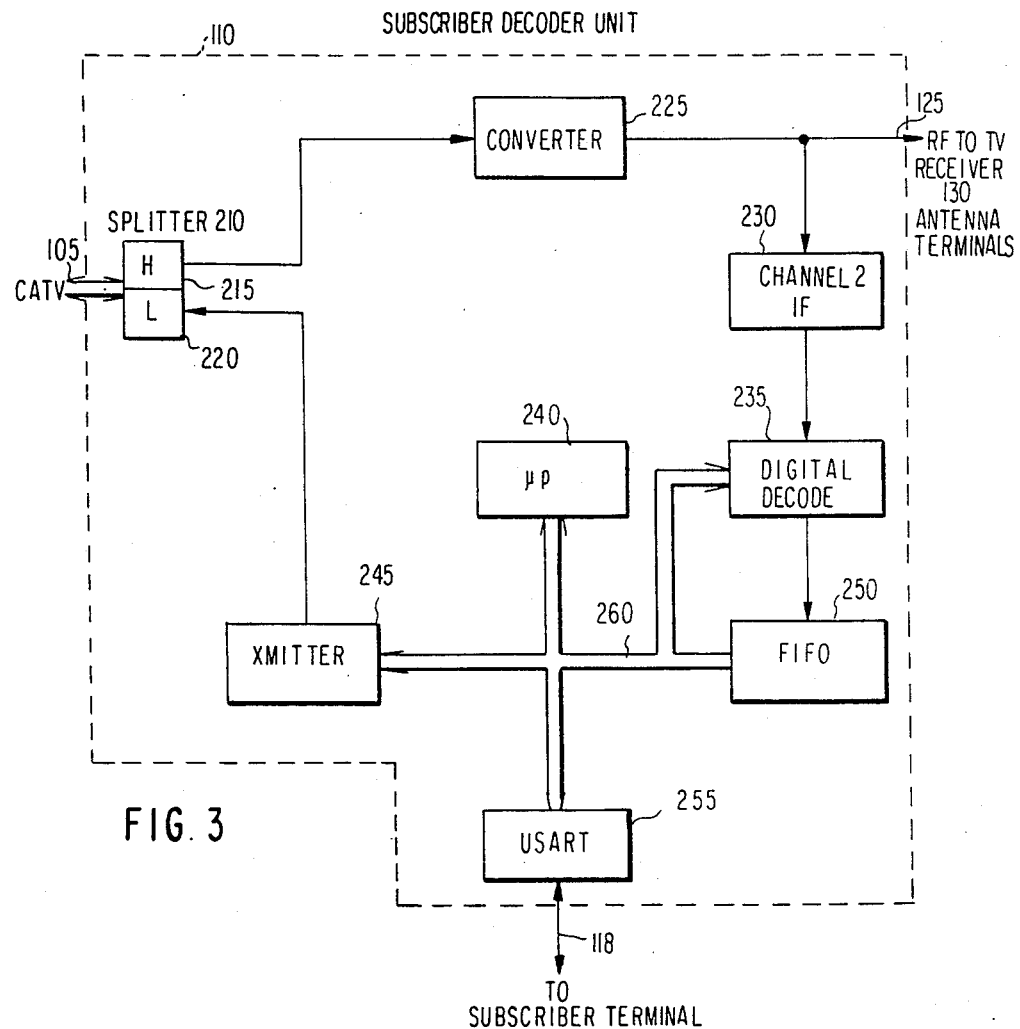
FIG. 3
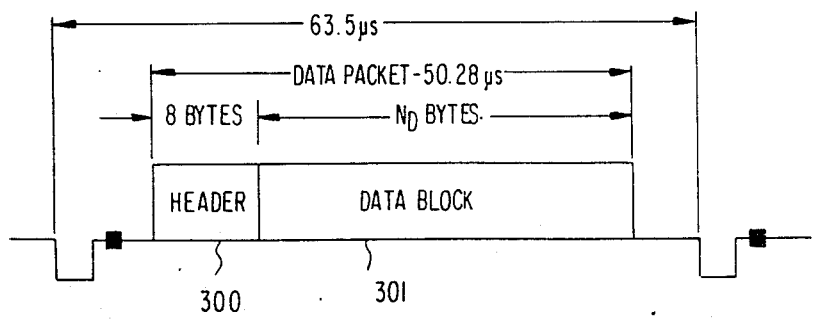
FIG. 4  FORWARD TRAFFIC PACKET

FORWARD TRAFFIC HEADER

REVERSE TRAFFIC PACKET

REVERSE CHANNEL UTILIZATION

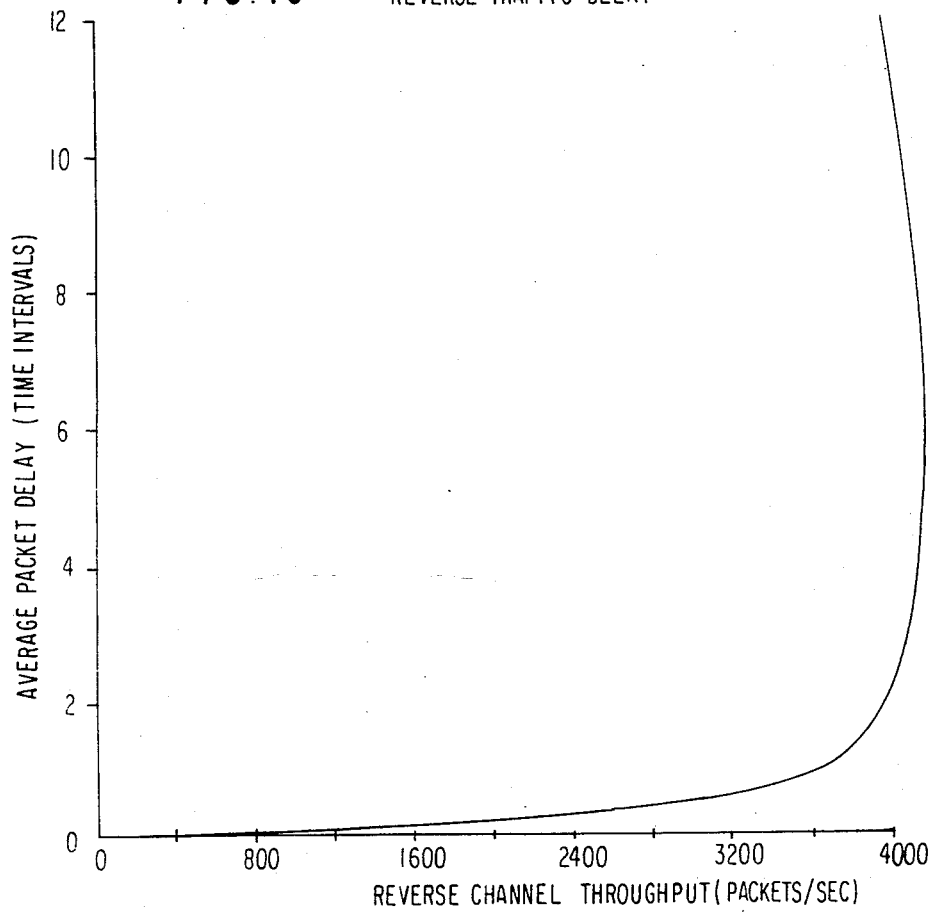
FIG. 10 REVERSE TRAFFIC DELAY
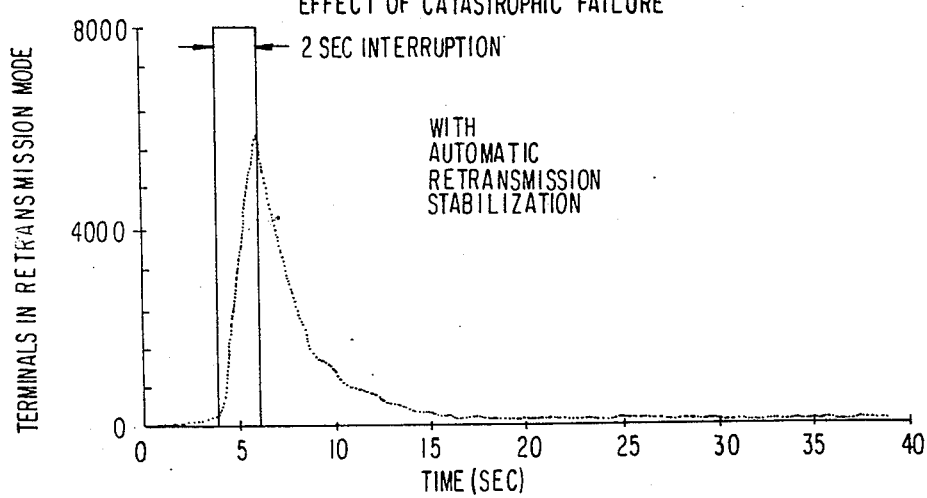
FIG. 11 EFFECT OF CATASTROPHIC FAILURE

MULTIPLE ACCESS COMMUNICATION ON A CATV REVERSE CHANNEL

DESCRIPTION

1. Technical Field

The present invention relates to interactive, multiple access communication, and more particularly, interactive, multiple access communication on a CATV reverse channel.

2. Background Art

Community antenna television systems (hereinafter CATV) were developed originally to fill the need of potential television viewers who were located outside the geographic region covered by adequate television signals. Prior to CATV, if such an individual desired to receive television signals of usable strength, a rather large antenna structure was necessary. CATV provides a single point of reception (large, highly effective antenna) and the signals from this single point of reception are distributed among a plurality of users by another communication link, originally a coaxial conductor on which the radio frequency signals were impressed. It soon became apparent that the coaxial cable has sufficient bandwidth to distribute more TV programming than was ordinarily available "over the air". In fact, there was no reason to limit the programming material that was distributed by the coaxial cable to television signals actually received "over the air". This led to making what had previously been merely a reception point, more comprehensive by providing it with apparatus for originating or recreating television signals that were not received "over the air". The coaxial cable, however, actually had sufficient bandwidth to define both forward and reverse channels. A forward channel could carry, among other things, a plurality of TV signals from the head end (previously called the receiving point) in a direction toward each of the remote subscribers, connected along the coaxial cable. A reverse channel could be made available for transmitting different signals back from the remote subscribers to the head end. These "different signals" (proposed for the reverse channel) were of much more limited content than even a single TV signal and could be used, for example, by a subscriber to communicate a request to receive a particular program, respond to multiple choice type queries and the like. Because the ensemble of subscribers is different in kind than the single head end equipment, some type of multiple access protocol is required to ensure that information transmitted by one of the subscribers did not "collide" with information transmitted by another subscriber, with the result that neither information was receivable. In the main, a polling type protocol was proposed in which the head end manifested to a selected subscriber authorization to transmit, and by ensuring that only a single subscriber had authorization to transmit at any one time, signals from plural subscribers could be effectively received at the head end.

See in this regard U.S. Pat. Nos. 3,668,307; 3,803,491; 3,943,447; 3,997,718; 4,002,843; 4,031,543; 4,035,838; 4,057,829; 4,077,006; 4,090,220; 4,322,854 and 4,343,042.

This polling protocol actually had originated as a solution to problems in more generalized data transmission, which were not restricted to conductive links. The polling protocol is not the only protocol known in the data transmission field, in fact there are a variety of protocols. However, the reverse channel of a CATV system presents an environment in which many of these known protocols are unusable.

For example, a popular protocol in the data transmission field is denominated Carrier Sense Multiple Access/Collision Detection (CSMA/CD). CSMA/CD itself is an outgrowth of what is referred to as Aloha, which originated in a radio environment.

In Aloha, a plurality of transmitters are allowed to use a common communication link (in this case a single carrier frequency) at arbitrary times (i.e., without reference to any particular ordering). This necessarily statistically generates "collisions" among transmitted signals, and signals which "collide" are usually rendered unreadable by the receiver due to the collision. It is of course necessary to provide some mechanism for detecting these collisions so that the transmissions encountering a collision can be repeated. In some cases, this mechanism is implemented by locating an auxiliary receiver adjacent each transmitter, tuned to the same carrier so the auxiliary equipment adjacent the transmitter can "listen" to its own transmission. So long as the transmitter's transmission is not garbled, the transmitter may be allowed to assume that no collision has occurred, and correspondingly, if the auxiliary receiver "hears" a garbled transmission, an assumption is made that the transmission will be unreadable at the intended receiver, and thus retransmission is necessary. This is the system referred to as CSMA/CD.

In these types of systems, if a collision does occur, and each of the transmitters associated with the collision is allowed to immediately retransmit, the collision will recur, and the process could be repeated ad infinitum. Obviously, some other mechanism is required. The mechanism usually chosen imposed a delay on transmitters encountering a "collision". To be effective, of course, the delays should be different at the different transmitters, and one class of systems uses a random delay (between some limits) to statistically assure that transmitters undergoing a first collision will not remain in a colliding condition. In many of these systems, to prioritize access to the communication link (here the term refers to the medium linking one set of transmitter-receiver; in ALOHA the multiple access link is between many transmitters and a single receiver), the random delays were allowed to become shorter and shorter so that a first transmitter which had undergone a much larger number of collisions than a second transmitter, would have a shorter delay and thus a higher probability of successful transmission. In connection with data transmission protocols, see Meisner et al appearing in *The Proceedings of Computer Network Symposium* (December 1977), at page 112 and following; the article on "Mitrenet" by Hopkins appearing in *The Proceedings of the LACN Symposium* (May 1979), page 169 et seq; the article on "Ethernet" by Metcalfe appearing in *Computer Networks* (1976) at page 3-47 and following; and U.S. Pat. Nos. 4,063,220; 4,161,786 and 4,282,512. In some of these systems, a central facility could monitor collisions and, in the face of growing numbers of collisions, command the contending transmitters to increase their mean retransmission delay.

The CATV environment does not lend itself to effective collision detection through a mechanism of "listen while talking". As a prerequisite to reaching as many subscribers as possible, CATV systems have many branches and sub-branches. This condition, coupled with the unidirectional nature of the reverse channel, means that a particular subscriber, located on a particular sub-branch has no way of "listening" to signals transmitted on the reverse channel but occurring on a sub-branch or branch closer to the head end than his own branch. Clearly, in the CATV environment, "listen while talk" is not an effective collision detection mechanism. Thus, application of CSMA/CD to the CATV reverse channel is contra-indicated.

Since the present invention is directed at providing two way interactive communications on a conventional CATV network, the prior art did not provide the needed mechanism. As indicated, CSMA/CD is ruled out in the CATV field. Because of the interactive nature of the desired communication link, polling techniques (also part of the prior art) were inadequate. Interactive, in this context, characterizes a system in which the maximum response time to a subscriber input is measured in less than 1 second (so long as that response time is physically possible due to loading considerations). This rapid response time can provide a user or subscriber (for example at a computer terminal connected to the CATV network) with the appearance of a dedicated communication link, so that only an almost imperceptible delay occurs between the time the subscriber presses a key on a keyboard and the time at which information displayed on a terminal screen changes as a result of that key depression. Polling techniques are much too slow for use in interactive application. Since polling systems require the head end to sequentially interrogate each subscriber terminal to determine if reverse traffic is waiting to be transmitted and the terminal can only send its traffic upon receipt of the poll message, the time which reverse traffic must wait is determined by the number of subscribers which must be polled and the polling rate. For a reasonable number of subscribers, and reasonable polling rates, response times as long as 10 to 20 seconds are not unusual, clearly inadequate for interactive applications.

The desire for interactive communication also makes stability of the system very critical. The definition of a stability parameter, and the manner in which interactive applications makes stability very critical, is described as follows. Let's assume that the system is designed to handle 20 new requests for transmission in a unit time period. The design of the system is arranged so that it is statistically unlikely for many more than 20 new requests to be entered in any unit time period. If, as can happen because of mere coincidence, a pair of transmissions collide, they must be retransmitted and so in the next unit interval, in addition to the new 20 requests which were assumed in the system design, there are 2 requests left over from the preceding interval, caused by a collision. If the transmission rate is short relative to the unit interval, then the system can easily absorb the increased number of transmission requests and statistically provide for a high probability that all 22 transmissions will be successful. However, in interactive application, the unit interval must be relatively short, substantially less than 1 second. Furthermore, the transmission rate has an upper limit which is imposed by practical available transmission rates. Under these constraints, it may well be that under the conditions outlined, a higher than average number of the 22 transmission requests will be unsuccessful, and as a result, in the succeeding interval, there are not only 20 new transmission requests, but a higher than average number of retransmissions from the preceding interval resulting from collisions in that preceding interval. This will further increase the probability of more collisions which will impose a greater burden on succeeding transmission intervals until the communication link is entirely blocked with a large number of retransmission requests, so large that no new transmissions can get through. The situation is actually exacerbated by the prior art technique of reducing the delay between retransmissions, as the number of unsuccessful transmissions increases. This condition is clearly unstable.

This instability should not be assumed to occur solely by a statistical quirk. Rather, especially where interactivity and short unit delays are required, instability can quickly result especially after a short system outage such as power interruptions or large noise impulses.

SUMMARY OF THE INVENTION

The invention solves these and other problems in the prior art by providing a multiple access communication protocol particularly suited for the CATV environment and apparatus to implement the protocol.

In accordance with one feature of the invention, system stability is automatically maintained without requiring extra communication bandwidth for maintenance of system stability. In accordance with this feature of the invention, each of the relatively autonomous remote subscriber transmitters is enabled to transmit at an arbitrary time, e.g. that time when it has information to transmit. The remote transmitters use the reverse channel of the CATV network to reach the head end receiver. In order to sense successful/unsuccessful transmissions, an acknowledgement from the head end, on the forward channel is relied on. More particularly, the remote transmitters transmit on the reverse channel of the CATV network. In the event the transmission is successful, and the head end receiver successfully copies the transmission, the head end receiver stimulates a head end transmitter, to transmit an acknowledgement message on the forward channel. Receipt of the acknowledgement message by a further receiver associated with the remote transmitter is used to evidence a successful transmission. Lack of receipt of the acknowledgement message is taken as evidence of an unsuccessful transmission.

Subsequent to a transmission, the autonomous remote transmitter goes into a delay state and will retransmit only on expiration of that delay. Actually, lack of acknowledgement will initiate a sequence of retransmissions, each retransmission delayed from the preceding, by a transmission delay D. Any retransmission in the sequence (and the succeeding retransmissions in that sequence) will be aborted, and the sequence terminated, by reception of an acknowledgement of a previous transmission. System stability is maintained by providing that at least some sequential retransmission delays D are larger than the preceding retransmission delay. This mechanism provides for an autonomous throttle which is used to regulate system load. More specifically, a Fibonacci series is used to determine selected delays as the sum of the prior two delays.

In accordance with a further feature of the invention, the transmission delay D is made up of two components: a major component which dictates the relative size of sequential delays, and a minor, randomizing component. The minor, randomizing component is of a duration nT, where n is a random integer of maximum number N, and T is the duration of a single transmission. The number N is chosen such that the maximum duration of the randomizing component is less than, preferably 10% or less than, the major component of delay. This ensures that at least some sequential delays will be longer than a preceding delay. In a preferred embodiment of the invention, specified transmission delays have a major component which is longer than the major component of the preceding transmission delay by at least the length of the major component of the still earlier transmission delay. That is, $D(n)=D(n-1)+D(n-2)$, where $D(n)$ is the major component of the delay in question, $D(n-1)$ is the major component of the preceding delay and $D(n-2)$ is the major component of the still earlier delay. In this fashion, two objectives are achieved: the randomizing component assures that a pair of transmitters engaging in a collision in one transmission interval will be unlikely to repeat that collision in the next transmission interval. By lengthening the transmission delays as aforesaid, a throttling action is exhibited such that, autonomously at each transmitter, the contribution to system load by a transmitter which repeatedly encounters a collision, is repeatedly decreased. This ensures that the system maintains stability. Because transmission delays are only increased as a result of collisions, the interactive nature of the communication is maintained as long as rapid communication is allowed by system loading.

BRIEF DESCRIPTION OF THE DRAWINGS

The present invention will now be further described so as to enable those skilled in the art to practice the same in the following portions of the specification when taken in conjunction with the attached drawings in which:

FIG. 3 is a block diagram of the subscriber decoder unit 110;

FIG. 4 is a timing diagram showing the relation between the duration of a forward traffic packet and in the corresponding equivalent video scan line;

FIG. 10 is a curve showing the relation between average packet delay (expressed as time intervals) versus reverse channel through put (expressed in packets per second); and FIG. 11 illustrates the results of a simulation showing the automatic retransmission stabilization feature.

DETAILED DESCRIPTION OF PREFERRED EMBODIMENTS

Figure 1:
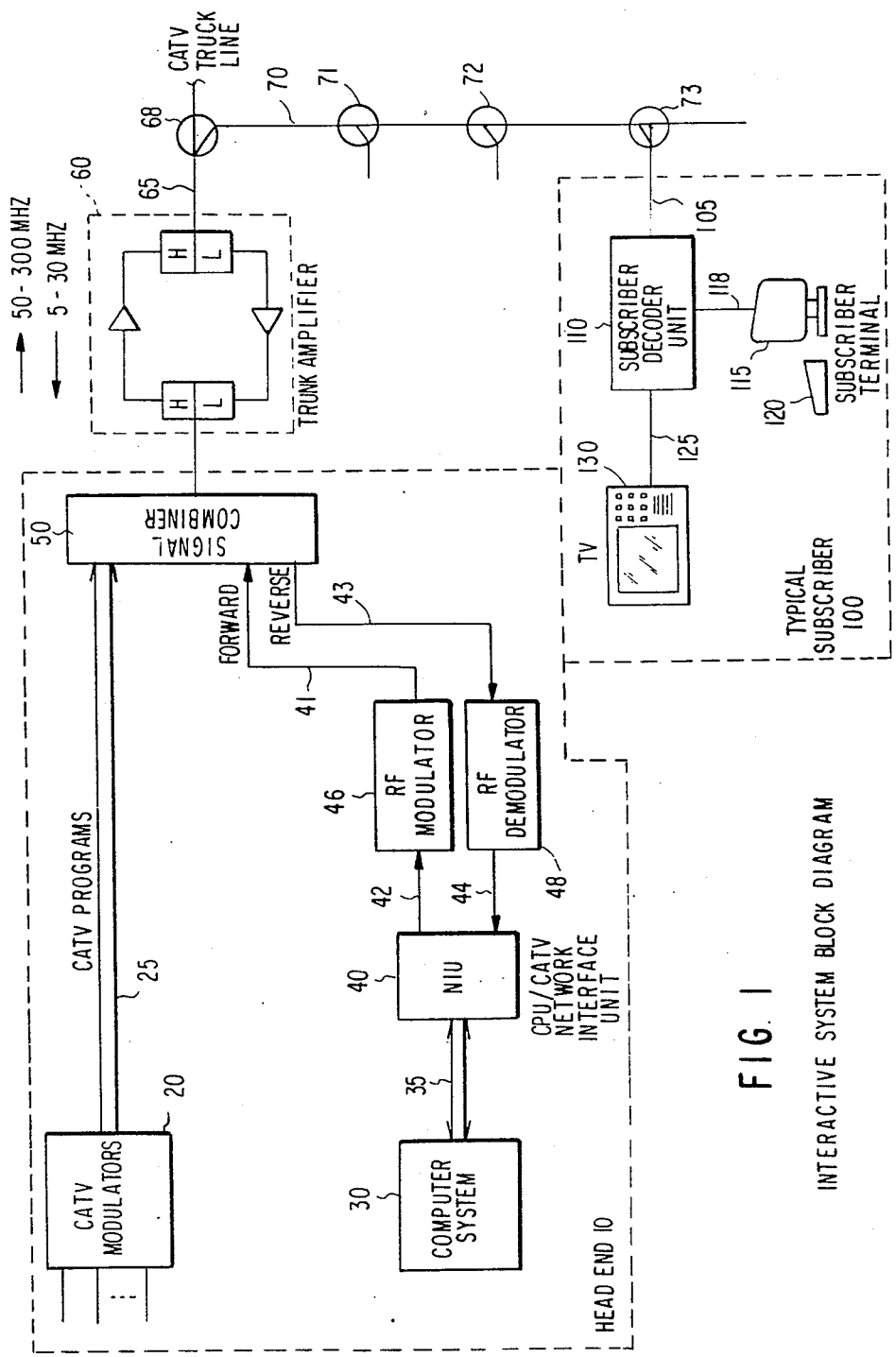
FIG. 1 is a block diagram representing the equipment at a head end 10, at a typical subscriber 100, and the CATV network interconnecting the same.

FIG. 1 is a block diagram of a CATV system incorporating the reverse channel communication of the present invention. As is shown in FIG. 1, the CATV system includes a head end 10 in communicating relation with one or more typical subscribers 100 via a CATV network including a trunk line 65 and one or more branch lines 70. The head end 10 includes purely conventional equipment such as a plurality of CATV modulators 20 providing CATV programming signals via a bus 25 to a signal combiner 50. The signal combiner 50 is coupled to the CATV trunk line 65. FIG. 1 illustrates the presence of a trunk amplifier 60 providing for bidirectional amplification, i.e. a forward channel (in the exemplary frequency band 50 to 300 MHz) is amplified in the direction from the head end 10 toward a typical subscriber and the same trunk amplifier includes amplification of a reverse channel (in the exemplary frequency band 5-30 MHz) in the direction from the typical subscriber to the head end 10. Those skilled in the art will understand that the single trunk amplifier 60 shown in FIG. 1 is merely exemplary, and depending upon the extent of the CATV network, other trunk amplifiers 60 may be judiciously located to provide for maintaining signal to noise ratio. FIG. 1 illustrates a typical CATV branch line 70 which is coupled through a tap 68 to the trunk line 65. The branch line 70 includes a representative number of taps 71-73, each of which may be coupled to a further sub-branch line or to a typical subscriber. As shown in FIG. 1, the typical subscriber 100 includes a TV receiver 130 which is coupled through the subscriber dedicated conductor 105 to the tap 73. In this fashion, the CATV programming signals originated at the modulators 20 can be made available at the receiver 130 of the typical subscriber 100. As thus far described, the CATV network is entirely conventional.

For purposes of this application, 'forward' and 'reverse' channels refer to the relative placement of the transmitters and receivers and carry no connotation concerning bandwidth. In the usual case, the reverse channel is significantly narrower than the forward channel. Furthermore, forward and reverse channels may each be wide enough to carry many TV channels or equivalent data channels.

In order to provide for data communication, the head end 10 includes a computer system 30 coupled over a bidirectional bus 35 to a network interface unit 40. The network interface unit 40 has an output over a conductor 42 to an RF modulator 46; the output from the RF modulator 46 is coupled over a conductor 41 to the signal combiner 50 and carries signals destined for the forward channel of the CATV network. In other words, the carrier of the RF modulator 46 is selected to lie within the forward channel frequency spectrum. The network interface unit 40 also has an input via a conductor 44 from an RF demodulator 48 which is coupled to the signal combiner 50 over a conductor 43. The RF demodulator 48 is tuned to a communication channel lying within the reverse channel frequency spectrum of the CATV network. The foregoing apparatus provides for the placing, on the CATV network, of digital data signals for transmission from the head end 10 to any subscriber; those signals having originated in the computer system 30. In addition, the foregoing apparatus also provides for the transmission of digital data from a typical subscriber 100 over the reverse channel of the CATV network to the computer system 30.

The complementary apparatus at the typical subscriber 100 includes a subscriber decoder unit 110 which provides for coupling the TV receiver 130 to the branch lines 70 via the tap 73, as well as for coupling the subscriber terminal including (as represented in FIG. 1) a video display unit 115 and a keyboard 120. Those skilled in the art will understand that other digital data equipment could also be employed at the subscriber terminal (e.g. printers, disk drives and other digital information handling equipment).

Figure 2:
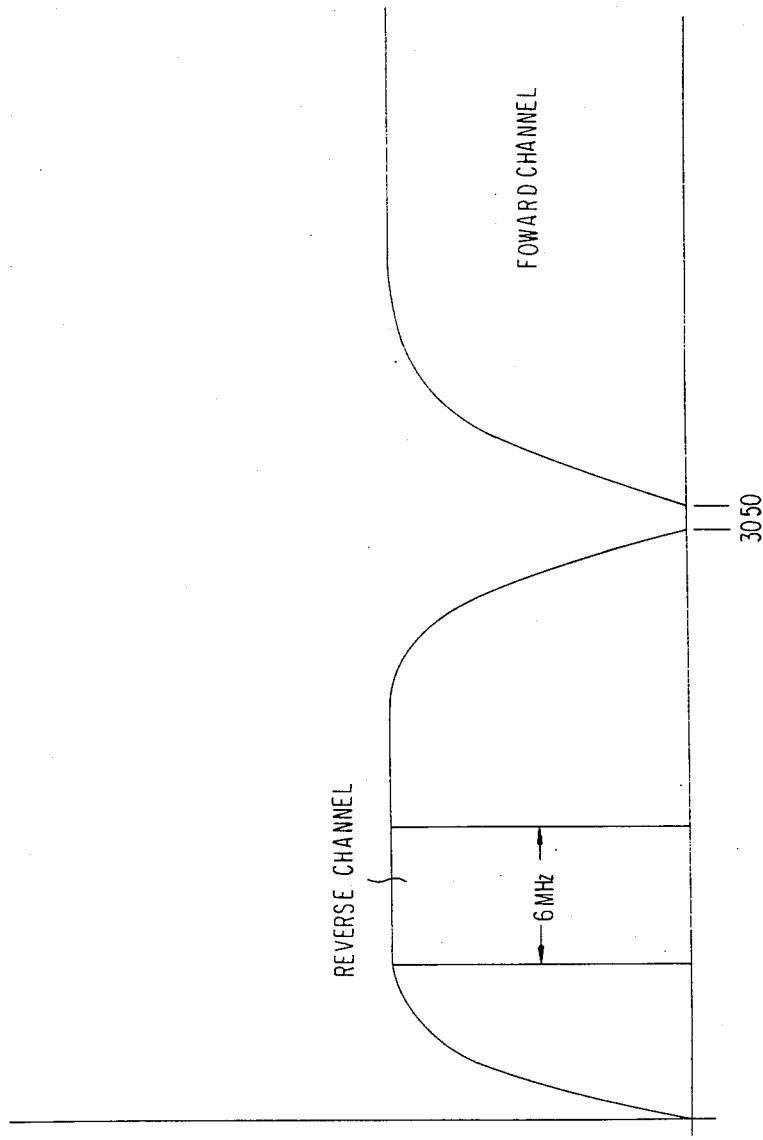
FIG. 2 is an example of the frequency spectrum showing the relation between the reverse channel and the forward channel.

FIG. 2 illustrates the frequency spectrum of the CATV network. Typically, the forward channel of the CATV network occupies the frequency spectrum above 50 MHz, usually to 300 MHz. Those skilled in the art will understand that this forward channel is capable of handling a plurality of TV (channels) program signals, simultaneously, in a frequency division multiplex fashion. Also shown in FIG. 2 is the reverse channel of the CATV network, specifically existing below 30 MHz. The specific reverse channel employed in a preferred embodiment of the invention, occupies approximately 6 MHz, and therefore, if desired, the frequency spectrum admits of frequency division multiplexing more than a single reverse channel through the CATV network. While the present description is limited to a description of the use of a 6 MHz forward and a 6 MHz reverse channel for digital data communication, that is only for purposes of simplifying the description, and actually the invention can be employed with multiple forward and reverse digital data transmission channels (of 6 MHz or of different bandwidth).

FIG. 3 is a block diagram of the subscriber decoder unit 110. More particularly, the conductor 105 enters the subscriber decoder unit 110 at a splitter 210, including a high frequency section 215, an output of which is coupled to a converter 225 and a low frequency section 220 which receives an input from a transmitter 245. The converter 225 may be any conventional converter for (selectively) down converting different TV programs in the forward channel to RF frequencies capable of being received by the TV receiver 130. The output of the down converter 225 is coupled directly to the antenna terminals of the conventional TV receiver 130 via the conductor 125. The output of the down converter 225 is also coupled to an intermediate frequency filter 230 for selecting a single one of the forward channels (channel 2 for example) and the signals passing through the filter 230 are coupled to a digital decode unit 235. The digital decode unit 235 forms one element in the processor subsystem of the subscriber decoder unit 110 which also includes a microprocessor 240, a USART 255, a transmitter 245, a FIFO memory 250 and a bus subsystem 260 interconnecting these elements.

The digital decode unit 235 is controlled by the microprocessor 240 to recover traffic for a single subscriber address. The decode unit 235 examines each packet header, and when a packet arrives containing the programmed address, the decode unit 235 stores the data block along with the continuity index and format bytes in the FIFO 250. The microprocessor 240 retrieves the data from the FIFO 250 and sends it to the subscriber terminal.

The microprocessor 240 performs a validity check on the data packet before passing it on to the subscriber terminal. To be judged valid, a packet must contain a continuity index which is 1 greater than the previous continuity index value, and the check byte calculated for the data block interval must match the check byte accompanying the data block (if no check byte is sent with the data block, the latter test is not performed).

An invalid packet is discarded, and the microprocessor 240 generates a retransmission message. This message consists of a special code byte accompanied by the expected continuity index for the aborted packet. This retransmission message has a higher priority than reverse traffic generated by the subscriber terminal but a lower priority than any packet retransmissions currently in progress, i.e. it will be the next new packet transmitted.

Subscriber terminal generated reverse traffic is received from the terminal and packaged for transmission on the CATV network by the microprocessor 240. The packaging process consists of attaching the framing, subscriber address, and packet-number bytes, and the calculation and attachment of a check character. The entire packet is then sent to the transmitter 245. The transmitter 245 turns on the carrier frequency, inserts a 4-bit delay, and sends the packet. The message is terminated with another 4-bit delay and then the carrier is turned off.

This apparatus provides for transferring digital data originally generated at the computer system 30 (in the head end 10) from the selected forward channel of the CATV network to the USART 225 for transmission to the subscriber terminal (115 and 120) via the bidirectional conductor 118. The apparatus also provides for the coupling of digital data generated at the subscriber terminal 115, 120 and received at the USART 255 via the bidirectional conductor 118 for transmission through the transmitter 245, splitter 210, and conductor 105 to the CATV network (on the reverse channel) for eventual receipt at the computer system 30.

The apparatus and techniques thus far described is sufficient for allowing the computer system 30 to communicate with a single typical subscriber 100, the remaining portion of this description will describe how many (for example thousands) of typical subscribers 100 can collectively communicate via the single reverse channel of the CATV network with the computer system 30.

Forward Channel

Figure 5:
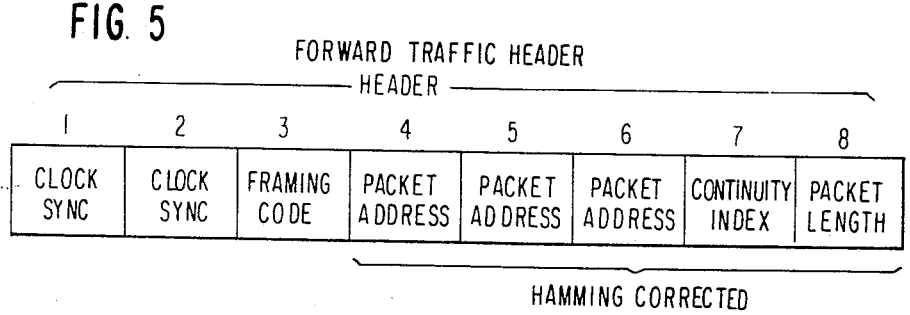
FIGS. 5 and 6 illustrate the make up of the forward traffic header and a reverse traffic packet; respectively.

The forward channel may use the DIDON data transmission technique developed by the French Television and Telecommunications Research Center (CCETT). This is described in detail in the Antiope Didon Broadcast Teletext System Standard (CCIR-System M-NTSC), July 1980, and only a brief description is included below. DIDON is a transparent digital data transmission technique which is designed to be compatible in standard television broadcasting networks. In terms of bandwidth, the forward data channel is the equivalent of one TV channel. Each of the horizontal scanning lines in the active portion of the video signal is encoded with a packet of digital information as shown in FIG. 4. Each packet includes a header 300 and a data block 301. The header 300 includes 8 bytes of synchronization, addressing and control information, as shown in FIG. 5. The first two bytes in the header consist of 16 bits of alternating 1's and 0's which are used to synchronize the receiver clock. The third byte is used to establish byte synchronization, i.e. it is used to locate the byte boundaries. The remaining bytes in the header 300 are all Hamming coded to allow detection of even multiples of errors and the correction of single bit errors. As a result of this coding process, only four information bits are available in each of these bytes. Bytes 4, 5 and 6 contain packet addressing information. These bytes are used as part of the subscriber terminal address. Byte 7 is a continuity index used to detect loss of data. The index may simply be a count sequence from 0 to 15 which is incremented by 1 for each packet with the same subscriber address. Byte 8 is a packet length byte which contains a code specifying 1 of 16 possible data block sizes.

The forward channel bit transmission rate is determined by dividing the total number of bits, data plus header, which must be transmitted during the video portion of each horizontal scan interval by the time available in each such interval. From FIG. 4, it can be seen that approximately 50.3 microseconds is available for data transmission. Bit rates of 3.58, 4.77 or 5.72 megabits per second correspond to data blocks of 14, 22 or 28 bytes. If a check byte is added, then the number of data bytes given above would be reduced by 1.

The standard television signal used in this country is a 525 line, 60 field system, in which half (262.5) the lines are transmitted each 1/60th of a second. Of these lines, a maximum of 253 are available for data transmission with the remainder being required for vertical blanking and synchronization. Some of these lines will be used to acknowledge reverse channel traffic, as will be indicated later. If $n_r$ is the number of lines used for these acknowledgement messages, and s is the number of active subscribers, the average subscriber forward traffic rate (in bits per second) is given by the following equation:

$$r_s = 8n_d(253 - n_r)f \quad (1)$$

where:
$r_s$ = average forward data rate per subscriber (bits per second),
$n_d$ = data block size (bytes per line),
$n_r$ = number of lines used for acknowledgement messages, and
f = TV field rate (fields per second) = 60.

The forward channel bandwidth is dynamically assigned by the network interface unit 40, each 1/60th of a second according to subscriber demand and reverse channel traffic, with reverse channel traffic acknowledgement messages having the highest priority. It is conceivable that all 253 packets could be acknowledgement messages, one subscriber could receive all of this traffic (253×$n_d$ bytes) or up to 253 subscribers could each receive $n_d$ bytes.

Reverse Channel

Figure 6:
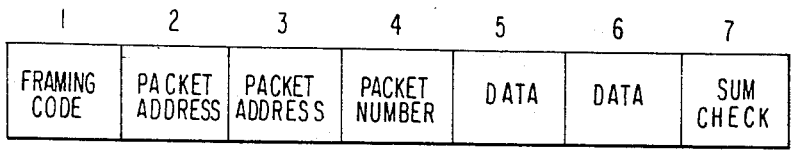

Information from a subscriber terminal is transmitted in packets of 56 bits in the format shown in FIG. 6. The first byte is a framing code which is used to establish byte synchronization. Bytes 2 and 3 contain subscriber address identifying the origination of the data. Byte 4 is the packet number which is used to detect loss of data and is similar to the continuity index byte 7 in the forward traffic header. This byte is simply a count sequence from 0 to 63 which is incremented by 1 for each packet transmitted by the same subscriber. Bytes 5 and 6 contain up to 16 bits of data. Byte 7 is a check character used to check the validity of the packet (excluding the framing code).

Each packet transmitted by a subscriber terminal must be acknowledged by the network interface unit 40. A copy of each packet transmitted is saved in the subscriber decoder unit 110. If, after an allotted time (which will be described below) an acknowledgement has not been received, the packet will be retransmitted with the same packet number. The packet will continue to be retransmitted until acknowledgement is received.

The network interface unit 40 acknowledges the receipt of each valid packet with a special code accompanied by the packet number and the address. Upon receipt of the acknowledgement, the subscriber decoder unit 110, identified by the address, increments its packet number in preparation for transmission of a new packet.

If a valid packet, received by the network interface unit 40, contains the same packet number as a previously received valid packet, the superfluous packet will be discarded.

Packets are transmitted at a rate of 1.43 megabits per second as a differential phase shift signal modulating a carrier frequency of 2.86 MHz which is present only during the packet transmission interval. A delay of 4 bit times is inserted following carrier frequency turn on and prior to carrier frequency turn off. The addition of this delay, which is used for network interface unit 40 receiver synchronization, increases the total packet length to the equivalent of 64 bits.

A packet will arrive incorrectly at the head end 10 primarily due to collisions with another packet. As a result of the collision, neither packet is acknowledged and both packets will necessarily be retransmitted. Reverse channel traffic, therefore, consists of original packets from subscriber terminals plus packet retransmissions due to collision.

In the absence of any collisions, the capacity or through put of the channel is simply 1.43 MHz per second, or in terms of 64 bit packets, 22,343 packets per second. It is known, however, that as a result of packet collisions and retransmissions, the effective channel capacity is reduced to approximately 18.4% of maximum capacity.

Figure 7:
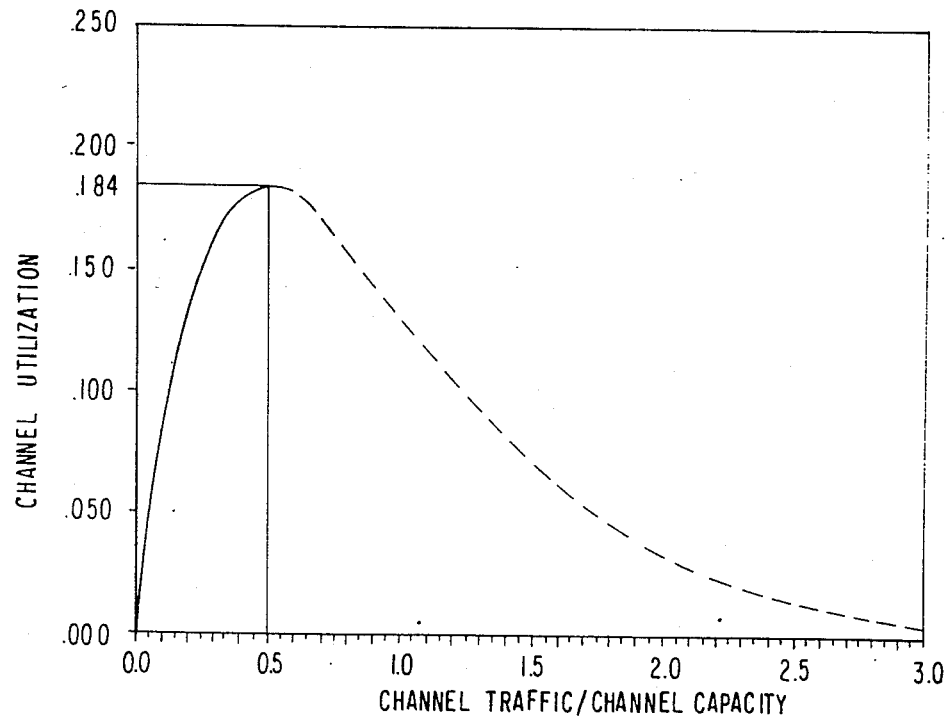
FIG. 7 is a curve showing channel utilization as a function of the ratio of channel traffic to channel capacity.

If channel utilization (defined as aggregate subscriber input rate divided by channel capacity) is plotted as a function of channel traffic (defined as original packets plus retransmission packets, also divided by channel capacity), the graph in FIG. 7 results. As shown in FIG. 7, channel utilization peaks at 18.4% at a time when the channel traffic occupies 50% of channel capacity. At this level of utilization, the channel is in an unstable condition and in danger of being congested with packet retransmissions.

We can use this value of channel utilization in the following equation to calculate the maximum number of active subscribers which can be supported:

$$s = (0.184)f/rb \quad (2)$$

where:
s = the maximum number of active subscribers;
r = average rate at which a subscriber generates packets;
b = bits per packet = 64;
f = bit rate = 1.43 × 10^6 bits/second.

In a typical interactive application, the user generates information by pressing keys on his keyboard (e.g. keyboard 120). Data taken over many years from the Plato system which is a large interactive time sharing system indicates that a typical user presses a key every 2 seconds. Each such key depression generates a packet and thus the keying rate is equivalent to 0.5 packets per second, or 32 bits per second. With this value for r in equation (2), the maximum number of simultaneous active subscribers which can be supported on the reverse channel is 8,222.

The forward channel protocol, allowing 12 bits of subscriber address, actually limits the number of subscribers to no more than 4,096 ($2^{12}$) unless some form of address extension can be incorporated. One method for extending the address is the use of the first byte in the data block interval as an additional address byte. Even if this additional byte is Hamming coded, the maximum number of different addresses is expanded to 65,536. Using values of either 4,000 or 8,000 active subscribers, we can calculate the average forward traffic rate per subscriber from equation (1).

The value of $n_r$ can be calculated by observing that in each 1/60th of a second, the number of reverse channel acknowledgement packets which must be transmitted is simply equal to the number of valid reverse traffic packets which arrive, or:

$$n_r = ks/60 \qquad (3)$$

where:
k = the average reverse traffic rate per subscriber (packets per second);
s = the number of active subscribers.

For k=0.5 packets per second, we generate either 34 or 68 acknowledgement packets corresponding to 4,096 or 8,192 active subscribers.

Using these values in equation (1) yields the forward traffic rates shown in the following table:

TABLE 1

| $n_d$ (Bytes) | Average Forward Traffic Rate (Bits Per Second) | |
|---|---|---|
| | 4,096 Subscribers | 8,192 Subscribers |
| 14 | 359 | 151 |
| 22 | 564 | 238 |
| 28 | 718 | 303 |

It should be noted that these are average rates and the peak rates may be much higher. Actual experimental data, as observed in the Plato system, indicates that even when a terminal is active, it receives traffic only approximately 20% of the time. On this basis, the average forward traffic per receiving terminal would be increased five-fold.

Automatic Stabilization

As indicated above, at channel utilizations of 18.4%, the system is at a point of instability. Without some type of corrective or throttling action, the channel through put would decay to zero and channel traffic would consist only of retransmissions.

The stabilization or throttling action is desirably autonomous (each subscriber decoder unit 110 can regulate its own transmission without the necessity for a centralized control). This is a substantial advantage in eliminating the overhead bandwidth that would otherwise be dedicated to centralized control techniques. Stabilization techniques adjust the time at which a retransmission is permitted as a function of the number of previous retransmission attempts.

Initially, an interval of time is defined which is greater than the round trip transmission time from any subscriber to the CATV head end 10, this round trip transmission time includes not only the propagation delay from subscriber to head end and back, but also includes the time required by the head end 10 to receive a packet, generate and transmit an acknowledgement message. Accordingly, the interval provides adequate time for the subscriber to receive an acknowledgement for any successfully transmitted packet. Retransmissions are permitted substantially only at integral multiples of this interval. We note here that the invention is particularly applicable where, as here, the duration of a single packet (for example 40 microseconds) is much shorter than the propagation delay (measured, for example, in milliseconds).

Figures 8, 9A, 9B:
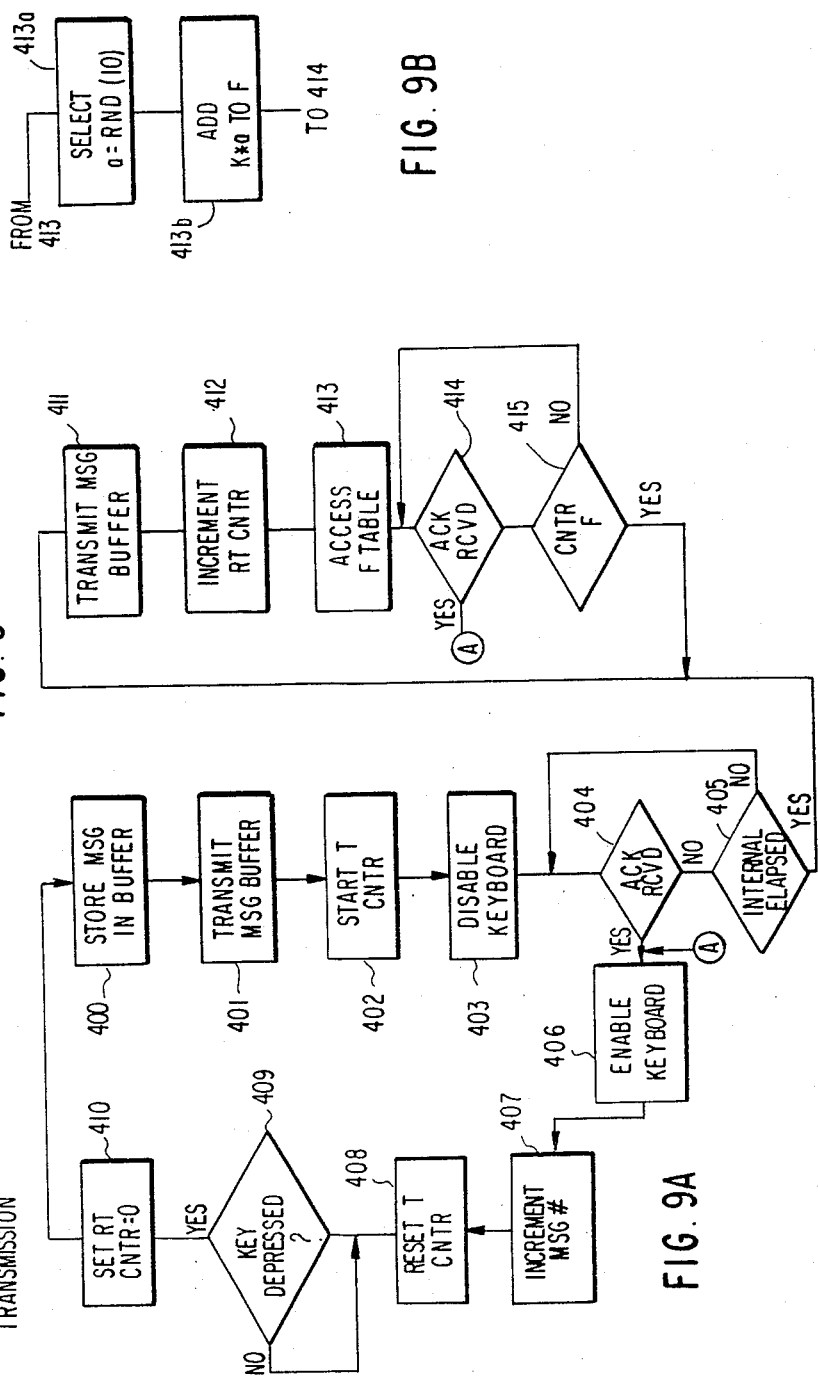
FIG. 8 is a timing diagram illustrating the relation between an initial transmission and sequential retransmissions.
FIGS. 9A and 9B are flow diagrams illustrating implementation of the retransmission sequence.

FIG. 8 shows a typical sequence of a preferred embodiment. More particularly, FIG. 8 shows an initial transmission occurring at time t=0 (time is measured in the number of intervals from this initial transmission). After expiration of one interval of time in the absence of an acknowledgement, a first retransmission is effected ($R_1$). The remaining portion of this description will assume that no acknowledgement is received. After the second interval, a second retransmission $R_2$ is effected. A third retransmission $R_3$ is effected after the third interval. The fourth retransmission, $R_4$, however, is not effected until after five intervals. Retransmission $R_5$ is not effected until after the eighth interval. $R_6$ occurs at the end of the 13th interval, $R_7$ occurs at the end of the 21st interval, and $R_8$ does not occur until the end of the 34th interval. Each retransmission is timed from the preceding retransmission by a delay. The delay for the first three retransmissions ($R_1-R_3$) is common at one interval. However, beginning with the fourth retransmission, the delay between that retransmission and the preceding retransmission is equal to the sum of the two previous delays. That is, $d_4$ (the delay between the third and fourth retransmission) is equal to the sum of $d_3+d_2$. Likewise, any delay $d_n$ (for the fourth or any subsequent retransmission) is equal to the sum of $d_{n-1}+d_{n-2}$. FIG. 8 only shows the sequence of retransmission through the eighth. The table reproduced below shows the sequence of retransmissions through 16. In the first column of the table, the retransmission attempt is numbered; in the second the interval, at the end of which the retransmission is effective, is numbered (remembering each interval is as defined above); the third column is the delay between that retransmission and the previous retransmission (measured in the number of intervals); and the fourth column is the effective transmission rate of the terminal if it transmitted only at a periodic rate governed by the delay between the retransmission and the prior retransmission.

TABLE 2

| Retransmission Attempt # | Following Interval # | Delay (Measured in Number of Intervals) | Packet Retransmission Rate (Packets/Sec) |
|---|---|---|---|
| 1 | 1 | 1 | 30 |
| 2 | 2 | 1 | 30 |
| 3 | 3 | 1 | 30 |
| 4 | 5 | 2 | 15 |
| 5 | 8 | 3 | 10 |
| 6 | 13 | 5 | 6 |
| 7 | 21 | 8 | 3.75 |
| 8 | 34 | 13 | 2.30 |
| 9 | 55 | 21 | 1.43 |
| 10 | 89 | 34 | 0.88 |
| 11 | 144 | 55 | 0.55 |
| 12 | 233 | 89 | 0.34 |
| 13 | 377 | 144 | 0.21 |
| 14 | 610 | 233 | 0.13 |
| 15 | 987 | 377 | 0.08 |
| 16 | 1597 | 610 | 0.05 |

Those skilled in the art will recognize that the second column is a Fibonacci series, an exponentially increasing series in which any entry is the sum of the two previous entries. The same, or the third column can be characterized as forming a geometric progression.

Implementing the retransmission delay described above can be effected with the flow chart shown in FIG. 9A. FIG. 9A shows that portion of the flow chart of microprocessor 240 governing enablement of the transmitter 245. As shown in FIG. 9A, the transmitter enablement function is part of a loop of functions including functions 400–404 and 406–410. For purposes of description, we can begin at function 400 where a message destined for transmission is stored in a message buffer. Function 401 effects transmission, e.g. enables the transmitter 245 to copy the message onto the CATV network. Function 402 starts a T counter, this T counter will count up in time units so that we can determine how much time has passed since the initial transmission, as we will see, this loop that we are discussing provides for resetting the T counter at the appropriate time. Function 403 disables the keyboard, thus preventing any further transmissions until the message transmitted at function 401 is acknowledged as having been received. Function 404 checks to see if an acknowledgement has been received. If one has been received, then function 406 is implemented to reenable the keyboard. Function 407 increments a message number, as indicated above this is one component of the next message to be transmitted. Function 408 resets the T counter, so that when function 402 is again effected, the counter can begin counting from 0. The remaining functions in the loop are provided for the next message transmission. Function 409 checks to see if the user has depressed another key, and if not, the processor loops waiting for a new key depression. When a key depression is detected, function 410 sets another counter, the RT (retransmission) counter to 0, the reasons for this will appear hereinafter and function 400 is again effected to store the new message in the buffer for its transmission.

If back at function 404, an acknowledgement was not received, then function 405 checks to see if the retransmission interval has yet elapsed. This is effected by accessing the current contents of the T counter. If the interval has not elapsed, then the routine jumps back to function 404. So long as the retransmission interval does not elapse, a loop of functions 404 and 405 is performed until either the retransmission interval does elapse, or an acknowledgement is received. Assuming that the interval elapses in the absence of reception of an acknowledgement, function 411 transmits the contents of the message buffer. Since the message buffer (loaded at function 400) has not been changed, the original message, along with the original message number, is transmitted again. Function 412 increments the RT counter (the counter reset at function 410 after a transmission). Assuming this is the first time through a loop of functions 411–415, the RT counter has been set to 0 and therefore function 412 increments to a count of 1, signifying the first retransmission has been effected. As described above, the delay between any retransmission and a subsequent retransmission is determined by Table 2 reproduced above. Therefore, function 413 accesses the F table (corresponding to Table 2 reproduced above) at a location defined by the contents of the RT counter to extract an F parameter (defining the delay between the retransmission that had been effected at function 411, and the next retransmission). Function 414 checks to see if an acknowledgement has been received. If so, processing skips to point A to complete the functions required after reception of an acknowledgement. On the other hand, if an acknowledgement had not been received, function 415 is executed. This compares the contents of the T counter with the parameter F. If the contents of the T counter is less than F (the next retransmission should not yet be scheduled), processing loops back to function 414. This loop will continue until either an acknowledgement is received or the T counter exceeds the parameter F. In the latter event, processing loops back to function 411 where at the next retransmission is effected. In this fashion, the retransmission rate is governed by the F table to automatically throttle the retransmission rate of the subscriber terminal so as to maintain the entire system within a stable region. Those skilled in the art will understand that a variety of alternative functions can be employed to implement the described invention.

The preceding description provides for autonomously throttling the transmission rate on any terminal in the absence of an acknowledgement. While unlikely, it is possible that two different subscribers attempt an initial transmission at exactly the same time (thus causing a collision). In that event, since the F table at both subscribers is indeed identical, the same two subscribers could mutually interfere, ad infinitum. Accordingly, to prevent this possibility, the retransmission delay, in a preferred embodiment, is actually comprised of two components. The duration of the major component has already been discussed. However, added to this major component is a minor randomizing component as will now be described. The randomizing component is made up of a duration equal to a random number a (in the range 1–A) multiplied by a packet interval, e.g. 64 microseconds. By selecting A to be sufficiently small, the addition of this minor delay component does not significantly alter the throttling action. For example, with A in the range 10–20, the minor randomizing delay would always be less than half of any interval, actually a value of 10 is preferred for A.

This can be implemented in the flow chart of FIG. 9 by adding the functions 413a and 413b, between the functions 413 and 414, as indicated in FIG. 10.

Once the F table is accessed, function 413a selects a random number between 0 and 10, to identify a. Function 413b adds to the quantity F, the quantity K*a, i.e. the delay F is increased by the minor randomizing component. The constant K is defined as the ratio between the packet interval (for example 64 microseconds) and the unit interval (for example 33 milliseconds).

The average delay incurred by any packet travelling through the reverse channel of the CATV network is a function of instantaneous channel loading. In the absence of any collisions, each packet arrives safely at the network interface unit 40 on the original transmission. As channel activity increases, however, collisions occur and retransmission are required which delay the arrival of a valid packet at the network interfacing at 40. A graph of calculated packet delay as a function of channel through put is shown in FIG. 10. The delay is normalized by retransmission time intervals and in order to calculate the delay in units of seconds, a value extracted from FIG. 10 should be multiplied by the chosen interval (for example 33 milliseconds). The average number of time intervals required for a valid packet transmission remains less than two until channel throughput approaches the effective capacity of FIG. 7. If less than two intervals are required, then from Table 2 it can seen that successful transmission occurs on the first or second retransmission attempt resulting in an average delay of two intervals, e.g. 67 milliseconds.

A substantial advantage of this stabilization technique is that stable operation can be quickly restored, automatically, following even a catastrophic failure. FIG.

11 illustrates a computer simulation of an 8,000 subscriber system which suffers a 2 second interruption in service. Such an interruption might be caused by technicians performing maintenance duties or a momentary loss of line power due to a nearby lightening strike. During the loss of service, a queue of packets develops with all active terminals operating in a retransmission mode. As can be seen, normal service is automatically restored within approximately 10 seconds of the restoration of CATV service.

Similarly, stability is automatically maintained for momentary overload conditions.

The foregoing description has assumed that traffic in the reverse direction is much lower than in the forward direction, however, the invention can also be used in applications where high reverse traffic rates occur. In such an application, a subscriber with a large volume of traffic can send a packet requesting dedicated reverse channel space. The network interface unit 40 may then respond by issuing inhibit commands to all other subscriber decoder units followed by a channel access grant command to the requesting subscriber. The subscriber may then use the entire reverse channel bandwidth to transmit a block of traffic.

As so far described, the subscriber can capture forward traffic in that portion of the forward channel which is passed by the filter 230. The subscriber has available a transmitter 245 for placing packets in the reverse channel. Since the subscriber's receive function is tuned in the forward channel, and the transmitter 245 is tuned in the reverse channel, they are mutually exclusive (see FIG. 2), e.g. the receive function is incapable of responding to reverse channel traffic originated at the subscriber terminal, or at any other subscriber terminal transmitting in the reverse channel. This is not at all detrimental because in the CATV environment, the reverse channel traffic passing a particular subscriber is not representative of all the reverse channel traffic. Specifically, the reverse channel traffic placed on the CATV network at a location closer to the head end 10, than is the typical subscriber, will not be available at the physical portion of the reverse channel which is available to the subscriber. This characteristic, however, does not rule out the possibility of subscriber-subscriber communication, although it does rule out direct subscriber-subscriber communication. A subscriber-subscriber path can be fashioned by concatenating the reverse channel from a transmitting subscriber to the head end 10 with a forward channel portion from the head end 10 to the receiving subscriber. The ability to provide this "channel" merely requires arranging the NIU 40 and computer system 30 at the head end 10 so as to copy those reverse channel packets received from a transmitting subscriber, onto the forward channel destined for the receiving subscriber. Such capability is well within ordinary skill in the art, and no further description is necessary here.

In summary, the apparatus and methods disclosed herein permits subscribers to transmit traffic on the reverse channel of the CATV network at any time, without regard to the presence of other traffic on the reverse channel. In so doing, the methods and apparatus are able to provide very fast response to subscriber inputs, while providing automatic channel stabilization, so as to maintain fast response time during periods of peak activity while at the same time preventing channel congestion.

While the description to this point has been in terms of a progression in the duration of sequential retransmission delays, it is of course unnecessary to allow this progression to continue indefinitely. We presently believe that freezing the progression of retransmission delays after about 13-16 retransmission attempts will provide for adequate stability in practice. If we freeze the retransmission delay at 610 intervals, this gives a subscriber rate of 0.05 packets/sec or one packet in 20 seconds. Thus, while the claims speak of a sequence of delays with increasing duration, the sequence which is recited is limited to, typically about 15 retransmissions. If more than about 15 retransmissions is required, the succedding retransmission delays will be about the same duration.

We claim:

1. A method of multiple access communication for communicating information from a plurality of transmitters coupled over a common communication link to a receiver location comprising:

transmitting from a transmitter, with information to transmit, at an arbitrary time, over said communication link, initiating a sequence of retransmissions at said transmitter, said sequence terminating on receipt of an acknowledgement from said receiver, wherein at least some of said sequential retransmissions are spaced by increasingly longer delays.

2. The method of claim 1 wherein each of said transmitters is located at a different station, which station includes a further receiver incapable of receiving transmissions from any other transmitter sharing said common communication link.

3. The method of claim 1 which includes a second communication link coupling a further transmitter, associated with said receiver, with a plurality of further receivers, each said further receiver associated with a different one of said transmitters, and which includes the further step of:

transmitting an acknowledgement by said further transmitter to said further receivers on said second communication link in response to reception by said receiver of a message from any of said transmitters.

4. The method of claim 1 wherein each of said transmitters is located at a different station, and wherein an initial transmission, and each of said subsequent retransmissions by any of said transmitters is controlled without regard to the condition of said communication link.

5. The method of claim 1 in which each of said retransmissions is associated with a preceding delay and in which a sequence of retransmissions beginning with the fourth is preceded by a delay which is substantially the sum of those delays preceding the preceding two retransmissions.

6. The method of claim 5 wherein each said delay in said sequence is made up of two components, a first major component and a second minor component, wherein the major component of a fourth or subsequent transmission is equal to the sum of the major component of the two preceding delays.

7. Apparatus for multiple access communication for communicating information from a plurality of transmitters coupled over a common communication link to a head end receiver comprising:

first means for transmitting from a transmitter, with information to transmit, at an arbitrary time, second means for initiating a sequence of repeated retransmissions from said transmitter, said sequence terminating upon receipt of an acknowledgement from said head end receiver, said second means including delay means for producing at least some of said sequential retransmissions spaced by increasingly longer delays.

8. The apparatus of claim 7 in which said delay means inhibits the retransmission, from a prior transmission by a time delay D, at least some of said delays D being longer than a preceding delay by substantially at least the length of a delay preceding said preceding delay.

9. The apparatus of claim 7 in which said delay means spaces each of said sequential transmissions by a delay D, each of said delays D in said sequence, beyond a fixed number of delays, is longer than a preceding delay by substantially at least the length of a delay preceding said preceding delay.

10. The apparatus of claim 8 or 9 in which said delay means generates delays D made up of two components, a first major component and a second minor component, for randomizing said delays, wherein said delay means provides at least the major components of some of said sequential delays which are longer than the major component of the next preceding delay by the length of the major component of the still earlier preceding delay.

11. The apparatus of any one of claims 7-9 in which each said transmitter is at a different location, which location does not include a receiver capable of direct reception from any of said transmitters.

12. The apparatus of claim 11 in which said communication link is carried by a RF cable, said communication link is a reverse channel of said cable, and each of said transmitters is associated with a receiver tuned to a further transmitter, said further transmitter associated with said head end receiver, transmitting on a forward channel also carried by said RF cable.

13. The method of claim 7 in which each of said retransmissions is associated with a preceding delay and in which a fourth or subsequent retransmission in said sequence is preceded by a delay which substantially is the sum of those transmission delays preceding the preceding two retransmissions.

14. A method of providing multiple access communication on the reverse channel of a RF cable to a receiver located at a head end of said RF cable comprising the steps of:

transmitting from a transmitter with information to transmit at an arbitrary time, initiating a sequence of retransmissions from said transmitter, said sequence of retransmissions terminating on reception of an acknowledgement from said head end receiver, each of said retransmissions delayed from a preceding retransmission by a delay D, at least some of said delays D longer than a preceding delay at least by the length of a delay preceding said preceding delay.

15. The method of claim 14 in which each of said delays, beyond a fixed number of delays, exceeds a preceding delay by a duration at least substantially equal to a delay preceding said preceding delay.

16. The method of claim 14 or 15 in which each said delay is made up of two components, a first major component which becomes increasingly longer after a fixed number of delays, and a second, minor, randomizing component which has a duration on the order of the length of a single transmission.

17. The method of claim 16 in which said major component has a duration at least twice as long as the propagation delay from said transmitter to said head end receiver.

18. The method of claim 16 in which said major delay component has a duration at least ten times the duration of said minor delay component.

19. The method of claim 1 in which a sequence of durations of said delays forms a geometric progression.

20. The method of claim 1 in which a sequence of durations of said delays form a Fibonacci series.

21. The method of claim 6 in which a sequence of said major components of said delays have durations forming a geometric progression.

22. The method of claim 6 in which a sequence of said major delay components of said delays have durations forming a Fibonacci series.

23. The apparatus of claim 10 in which said delay means produces said delays with major components of durations forming a geometric progression.

24. The apparatus of claim 10 in which said delay means produces said delays with major components of duration forming a Fibonacci series.

25. The method of claim 16 in which a sequence of said major delay components have durations forming a geometric progression.

26. The method of claim 16 in which a sequence of said major delay components have durations forming a Fibonacci series.

* * * * *